(12) United States Patent
Won et al.

(10) Patent No.: US 6,339,800 B1
(45) Date of Patent: Jan. 15, 2002

(54) METHOD FOR TRANSMITTING DATA BETWEEN A MICROPROCESSOR AND AN EXTERNAL MEMORY MODULE BY USING COMBINED SERIAL/PARALLEL PROCESS

(75) Inventors: Na Ra Won; Sung Goo Park, both of Kyoungki-do (KR)

(73) Assignee: Hyundai Electronics Industries, Ichon-shi (KR)

( * ) Notice: Subject to any disclaimer, the term of this patent is extended or adjusted under 35 U.S.C. 154(b) by 0 days.

(21) Appl. No.: 09/223,386

(22) Filed: Dec. 30, 1998

(30) Foreign Application Priority Data

Dec. 30, 1997 (KR) .............................. 97-77873

(51) Int. Cl.⁷ .............................................. G06F 13/14
(52) U.S. Cl. ............................ 710/33; 710/31; 712/300
(58) Field of Search ............................ 710/20, 32, 33, 710/126, 29, 31; 712/10, 13, 42, 300

(56) References Cited

U.S. PATENT DOCUMENTS

| | | | |
|---|---|---|---|
| 4,760,517 A | * | 7/1988 | Miller et al. .................. 712/42 |
| 4,888,731 A | * | 12/1989 | Chuang et al. ................ 365/49 |
| 4,901,268 A | * | 2/1990 | Judd .......................... 708/513 |
| 5,084,814 A | | 1/1992 | Vaglica et al. |
| 5,404,460 A | | 4/1995 | Thomsen et al. |
| 5,430,859 A | | 7/1995 | Norman et al. |
| 5,475,854 A | | 12/1995 | Thomsen et al. |
| 5,561,055 A | | 10/1996 | Page et al. |
| 5,611,055 A | | 3/1997 | Krishan et al. |
| 5,613,078 A | * | 3/1997 | Kishigami .................. 710/126 |
| 5,613,144 A | | 3/1997 | Hall et al. |
| 5,613,393 A | | 3/1997 | Bessey |
| 5,634,069 A | | 5/1997 | Hicok et al. |
| 5,655,138 A | | 8/1997 | Kikinis |
| 5,664,213 A | | 9/1997 | Steele et al. |
| 5,809,233 A | * | 9/1998 | Shur .......................... 709/230 |
| 5,898,898 A | * | 4/1999 | Kleck ......................... 712/300 |

FOREIGN PATENT DOCUMENTS

| | | |
|---|---|---|
| JP | 62-212739 | 9/1987 |
| JP | 63-62045 | 3/1988 |
| JP | 5-89041 | 4/1993 |
| JP | 6-174802 | 6/1994 |
| JP | 8-153064 | 6/1996 |
| JP | 9-305535 | 11/1997 |

* cited by examiner

Primary Examiner—Thomas Lee
Assistant Examiner—Thuan Su
(74) Attorney, Agent, or Firm—Jacobson Holman, PLLC

(57) ABSTRACT

A method for transmitting data between a microprocessor and an external memory module through external package pins of the microprocessor, which includes the steps of: a) deciding N-bit full sized data to be transferred by using M, wherein N and M are positive integers and N is greater than M; b) sequentially transferring N/M number of M-bit divided data; c) temporarily storing N/M number of M-bit divided data; and d) combining the N/M number of M-bit divided data into the N-bit full sized data.

8 Claims, 6 Drawing Sheets

METHOD FOR TRANSMITTING DATA BETWEEN A MICROPROCESSOR AND AN EXTERNAL MEMORY MODULE BY USING COMBINED SERIAL/PARALLEL PROCESS

FIELD OF THE INVENTION

The present invention relates to a method for transmitting data in a microprocessor system; and, more particularly, to a method for transmitting data by using a combined serial/parallel data transmission technique between a microprocessor module and an external memory module.

DESCRIPTION OF THE PRIOR ART

A microprocessor is generally used as a central processing unit(CPU) of a computer system, and actually executes a plurality of instructions stored in a memory module. The microprocessor serves to perform an operation function, a memory function, and a control function by executing the instructions; and is generally made of one-chip. For representative example, there are Pentium and Pentium-Pro microprocessors manufactured by Intel Co., and 63000 series microprocessors of Motorola Electronics and Communications Inc.

The microprocessor has been initially designed for processing 4-bit data. Later, the size of data to be processed at a time was increased from 8 bits to 16 bits and, on these days, a microprocessor having 32-bit data size is generally used. As a high-performance microprocessor, a 64-bit microprocessor is already developed and commercially used. In addition, a microprocessor only for graphic usage is developed and used in order to process 128 bits data at a time.

Therefore, it is important to increase the size of data which can be processed at a time, and the performance of microprocessor can be greatly improved by increasing the size of data which can be processed at a time. Therefore, in the future, 128-bit and 256-bit microprocessors will be used in the microprocessor system.

However, as improving of the microprocessor, there occurs one important problem. According to the size of data to be processed at a time(the number of bits which can be processed at the same time), the bus having data lines identical to the size of data should be connected from a microprocessor to an external memory module. However, there is a limitation of pin numbers that can be attached during packaging of the microprocessor, so it reaches uppermost limitation to define the maximum size of data. That is, a 256-pin microprocessor should be connected through a data bus of 256-bit to the external memory module.

Furthermore, there are additional many control pins required necessary except for these data bus and address bus. That is, if the address bus of 64 bits is used, a 300-pin microprocessor is necessarily required. These pin number reaches nearly the maximum pin number that can be installed at a package by using a current packaging technology. Therefore, it is impossible to increase the size of data in a microprocessor having the limited pin numbers by using a conventional parallel data transmission technique.

SUMMARY OF INVENTION

It is, therefore, an object of the present invention to provide a method for transmitting data in a microprocessor system, which is capable of effectively overcoming the limitation of pin number caused by using a conventional parallel data transmission process.

A data transmission method employing a combined serial/parallel data transmission process in accordance with the present invention can be effectively used in a microprocessor system to overcome the limitation of pin numbers, caused when the data is processed at a microprocessor by using a conventional parallel data transmission process.

In accordance with the present invention, there is a provided a method for transmitting data between a microprocessor and an external memory module through external package pins comprises the steps of :a) dividing N-bit full sized data to be transferred by using M, wherein N and M are positive integers and N is greater than M; b) sequentially transferring N/M number of M-bit divided data; c) temporarily storing N/M number of M-bit divided data; and d) combining the N/M number of M-bit divided data into the N-bit full sized data.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

First, in order to fully understand a configuration and an operation of a microprocessor system in accordance with the present invention, it is necessary to understand a conventional parallel method. Therefore, a conventional parallel data transmission technique will be initially explained hereafter with reference to FIGS. 1 to 2.

Figure 1:
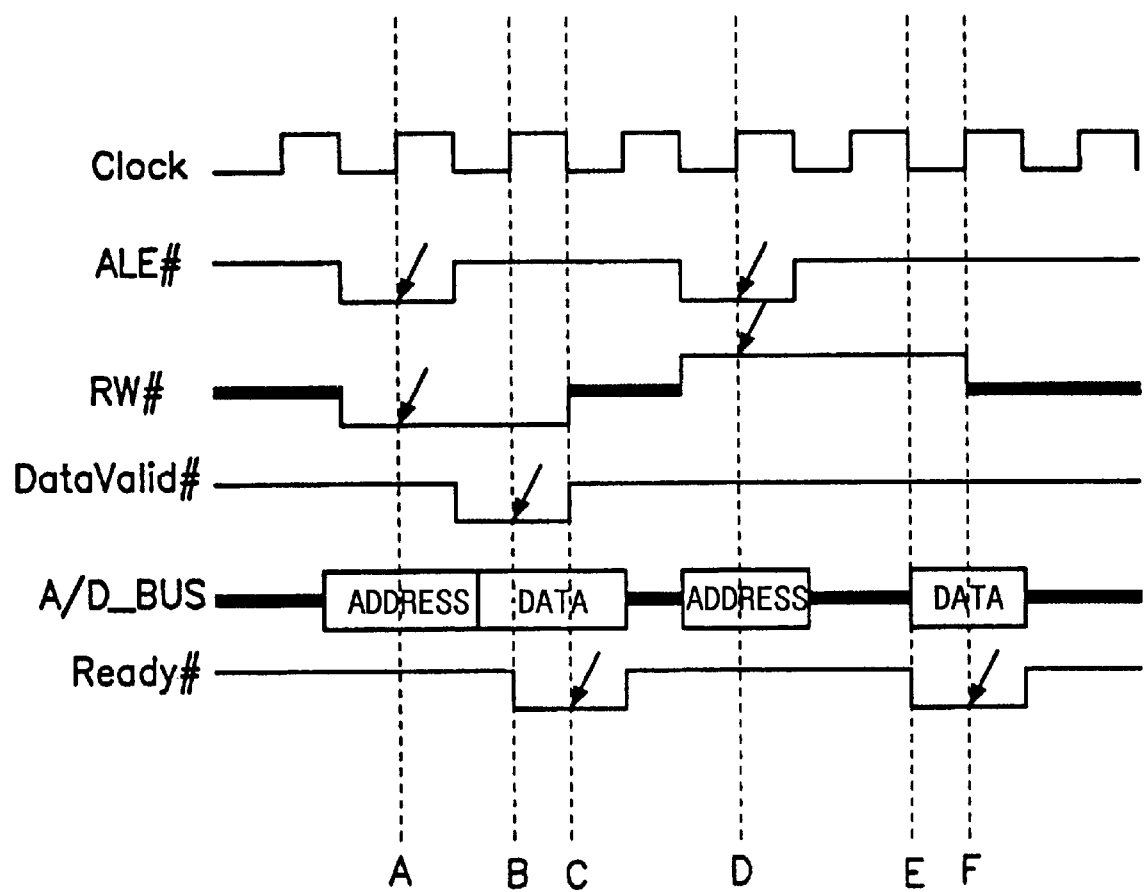
FIG. 1 represents a timing chart of a bus cycle of a conventional parallel data transmission technique.

FIG. 1 shows a bus cycle of the conventional parallel data transmission method. A clock signal described at the top of FIG.1 provides the synchronization between a microprocessor and a memory module. An address latch enable signal (ALE#) generated from the microprocessor serves to be latched address values by the external memory module. A read/write (RW#) signal shows whether a read (Read) cycle or a write (Write) cycle is performed in the microprocessor system. When the RW# signal is 0, the write cycle is executed. When the RW# is 1, the read cycle is performed. A data valid (Data Valid#) signal illustrates that there are valid data on a bus at the microprocessor. That is, the DataValid# is 0, it means that there is valid data on the bus. A ready (Ready#) signal is generated from the external memory module, and the external memory module successfully receives the data on the bus during the write cycle, and it successfully loads the data on the bus during the read cycle. On address/data bus (A/D_BUS), the data and the address signal are loaded. Here, all the signals designated by symbol # is an enable state when it is 0. And a thick line represents a meaningless value.

Figure 2:
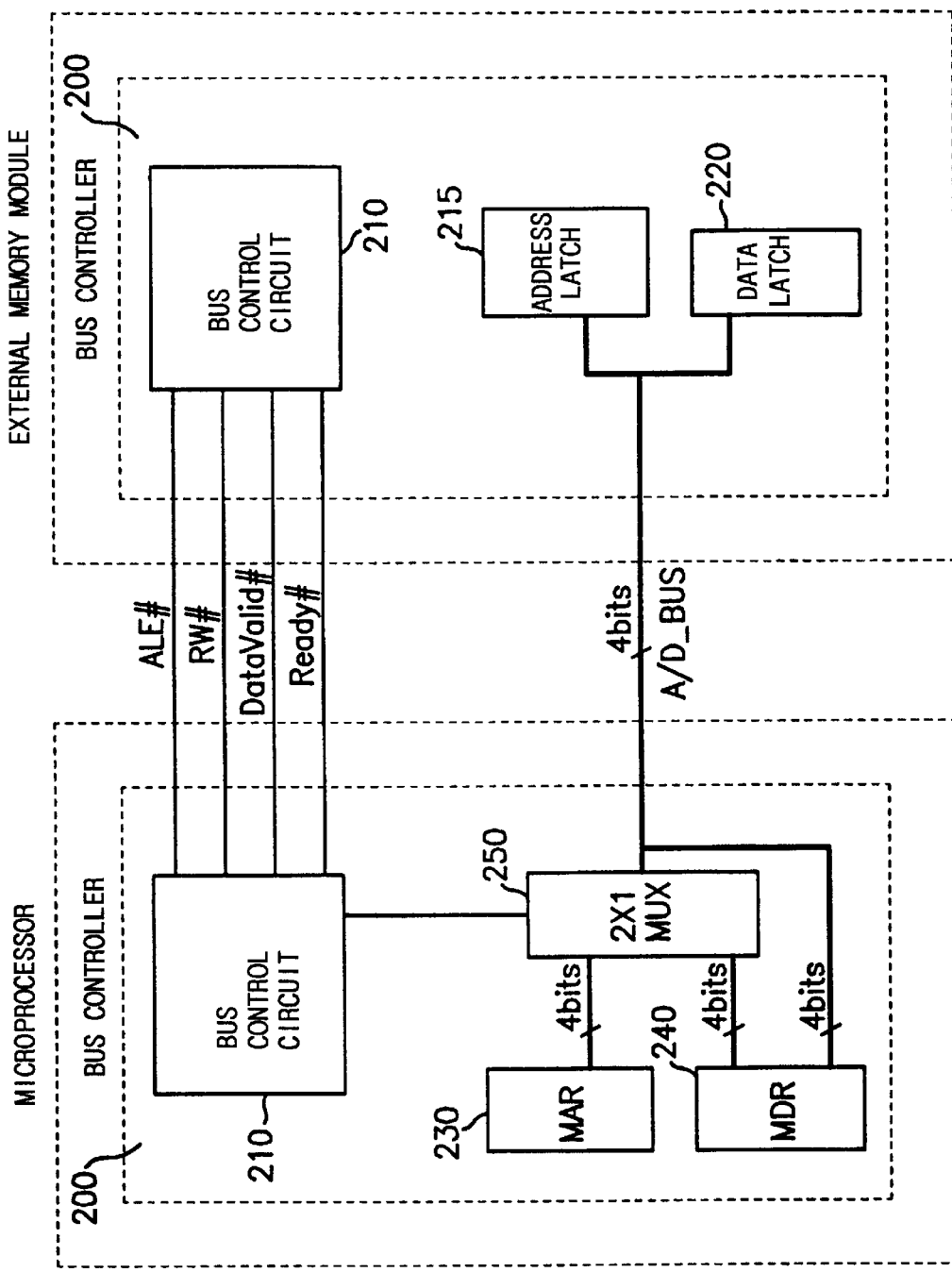
FIG. 2 illustrates a schematic diagram of a microprocessor system employing a conventional parallel data transmission technique.

FIG. 2 describes the data transmission between the microprocessor and the external memory module during the write cycle and the read cycle by using the conventional parallel data transmission method.

First, the write cycle is performed as the follows. The microprocessor makes RW# signal to be 0 in order to store full sized data to the external memory module. After address values are loaded on the A/D_BUS, ALE# becomes 0. The external memory module is responsive to ALE# to thereby latch the address values for writing the full sized data by receiving the address value from the bus. Therefore, write cycle begins. That is, the external memory module monitors ALE# when the system clock signal is positive edge, and latches the address values when ALE# is 0. Based on WR#, it is checked whether the microprocessor needs a read operation or a write operation(A shown in FIG. 1).

The microprocessor loads the address on the bus during one cycle. Thereafter, the microprocessor loads the full sized data on the bus and makes the DataValid# signal to be 0. The external memory module checks whether the full sized data is valid during a positive edge of a next clock. If the data is valid, the memory module makes Ready# to be 0 after the storage of the full-sized data (B shown in FIG. 1). The microprocessor monitors Ready# signal during a negative edge, and the microprocessor terminates the write cycle(C shown in FIG. 1).

During the read cycle, the microprocessor loads address value on the A/D_BUS, and makes RAW to be 1. Thereafter, the microprocessor then makes ALE# to be 0 to thereby start the cycle. The external memory module checks whether the ALE# is 0. If the ALE# is 0, the external memory module latches the address values from A/D_BUS, and if the RW# is 1, the start of the Read cycle is recognized thereby. At this time, the external memory module prepares full sized data to be read based on the address values (D shown in FIG. 1). When the data from the external memory module is loaded on the A/D_BUS, the ready signal becomes 0 (E shown in FIG. 1). The microprocessor checks Ready# at the negative edge of the clock. When Ready# is 0, the data value on the A/D_BUS is read by the microprocessor, and the read cycle is then terminated (F shown in FIG. 1).

A hardware configuration implementing the above conventional parallel data transmission is described in FIG. 2. Since the detailed description about the hardware configuration is not concerned with the present invention, the details are not described herein. But the outline will be demonstrated hereafter in order to easily understand the present invention. The conventional microprocessor and the external memory module have bus controllers 200 respectively for controlling each bus cycle. The bus controller 200 is provided with various circuits and registers. Since the detailed configuration of the bus controller is not concerned with the present invention, the bus controller is expressed briefly as bus control circuits and representative registers are only described in FIG. 2. A bus control circuit 210 generates control signals for all the hardwares constructing the bus device and manages to keep the bus cycle shown in FIG. 1 accurate. FIG. 2 shows the case of sharing of the address bus and the data bus, and a multiplexer (2*1 MUX) 250 is the component necessary for loading or receiving address and data on A/D_BUS at a proper time. A memory address register (MAR) 230 and a memory data register (MDR) 240 temporarily store address values of data stored in the memory module and data from the memory module, respectively. An address latch 215 and a data latch 220 are provided to the external memory module, so they temporarily store address values from the microprocessor and data to be read.

Figure 3:
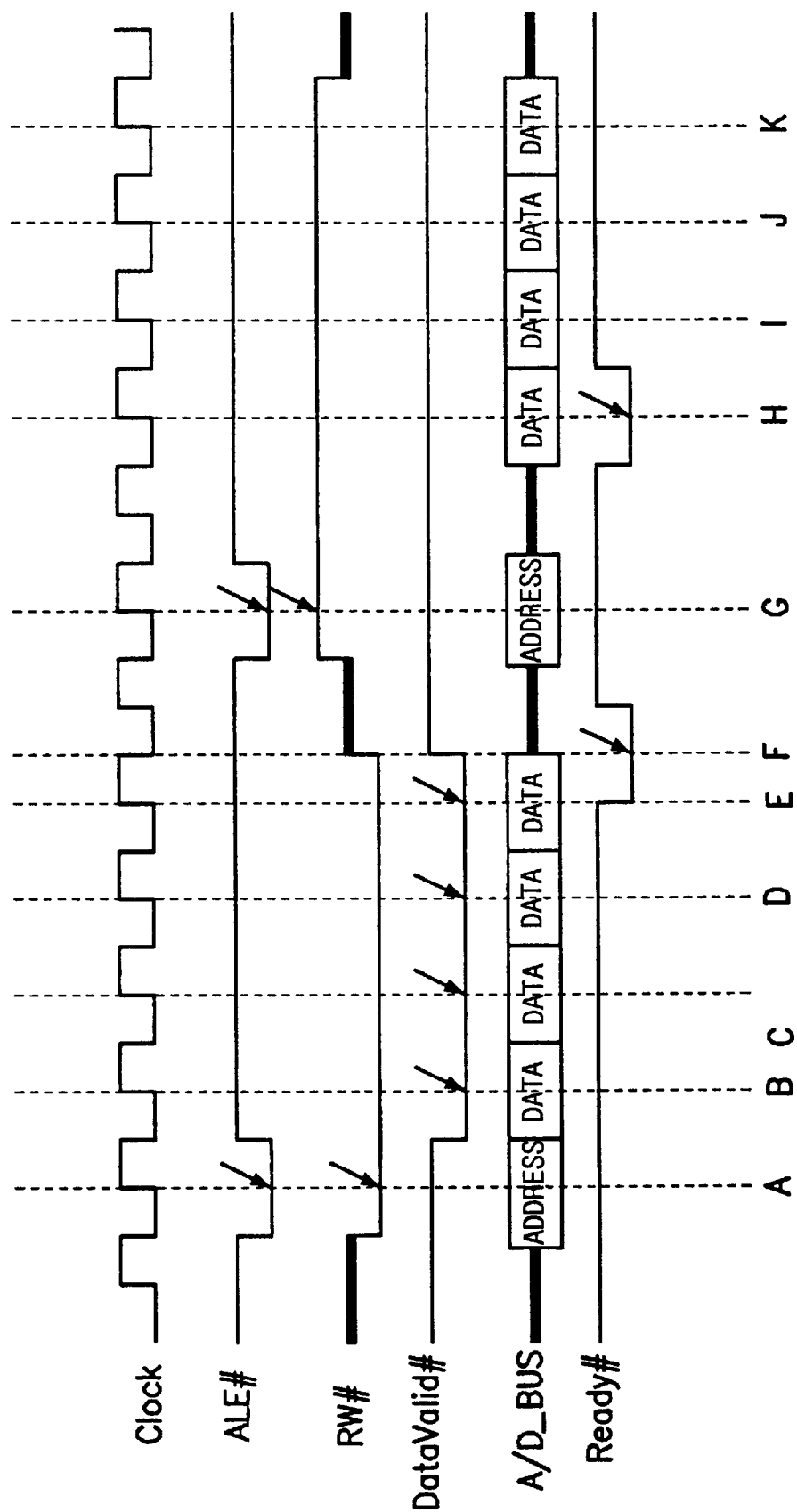
FIG. 3 describes a timing chart of a bus cycle of a combined serial/parallel data transmission technique in accordance with the present invention.

FIG. 3 shows the bus cycle of a combined serial/parallel data transmission method in accordance with the present invention. Signals shown in FIG. 3 are similar to that of the conventional parallel data transmission method.

As can be seen from the above, because of the limitation of pins of the microprocessor, there is problem that the size of data is increased to thereby improve the data processing capacity. In accordance with the present invention, in order to overcome above problem, the conventional parallel data transmission method has been improved to a combined serial/parallel data transmission method that the serial data transmission method is adopted to the parallel data transmission method in order to process the big capacity of data even by using small number of pins.

For example, supposing that 256 bits can be processed at a time, 256 pins are necessary for transmitting full sized data by the conventional parallel data transmission process. However, in accordance with the present invention, the pin numbers of the package, which is required for transmitting the full-sized data, can be effectively reduced. That is, 256 bits need not to be transferred at a time and 64 bits is transferred through 4 times. The data of 64 bits are transferred by using the conventional parallel data transmission method and the same four transmissions are performed by using a serial data transmission method. In this case, only 64 pins are necessarily required for the external pin numbers of the microprocessor and sufficient to be able to transmit 256 bit data successfully.

Furthermore, in accordance with the present invention, any size of data can be transferred between a microprocessor having a limited pin number and a general conventional memory module. For instance, the microprocessor having M number of external pins is available for transmitting N-bit data, and the N-bit data transmission between the microprocessor and the external memory module is achieved by using N/M times serial data transmission, wherein N and M are positive integers and N is greater than M.

In accordance with the present invention, in the case of sharing of the data bus and the address bus, the optimum efficiency can be obtained when the external pin numbers provided into the package is larger than the size of the address bus. Even if the address bits are 32 bits, the memory module of 4 Giga can be accessed thereby. So, even though the data processing capacity at a time is increased, there is no need for increasing the number of address bits. In the future, even though the microprocessors of 128 bits, 256 bits, and 512 bits are developed, 32 bits or 64 bits still can be used as address bits of the microprocessor system. For the most cases, the size of address bus is less than that of data bus. The optimum efficiency can be obtained when the address and data pin numbers are chosen as multiple of 2, which is less than the number of full sized data bits and identical to or larger than that of the address bus bits. In this case, the external memory bus cycle can be reduced, because the address bits can be transferred to the external memory module at a time.

On the other hand, in the case of non-sharing of data bus and address bus, M needs not be larger than the size of the address bus. In this case, the pin number, which can utilize the maximum performance of microprocessor, would be chosen by using an experimental technique. However, the size of M should satisfy the above described condition.

Furthermore, the present microprocessor system has a internal cache which is 512 Kbyte storage capacity. When the internal cache capacity exceed 512 Kbyte, the possibility, that the cache contents would be utilized without the access to main memory module, is nearly 99%. Repeatedly, the actual transmission of data through the external pins of the package seldom occurs. Therefore, the present invention adopting the combined serial/parallel data transmission method can be effectively employed in the current microprocessor system.

For the convenience of explanation, it is supposed that the size of data to be processed at a time be 16 bits. Therefore, the mentioned N is 16. And it is supposed that the external pin numbers of the microprocessor be 4, so that M becomes 4. And, it is supposed that the bits of address bus be 4. Therefore, in order to transfer the full sized data of 16 bits, 4 bits, so called N/M, should be transferred through 4 times. As shown in FIG. 3, the data transmission portion of the timing diagram is extended by 4 cycles. Each 4 bit data is transferred during each clock period ox the system clock. In order to implement such a bus cycle, the hardware architecture of the microprocessor and the external memory module in accordance with the present invention should be modified from that of a microprocessor and an external memory employing the conventional parallel data transmission method.

Figure 4:
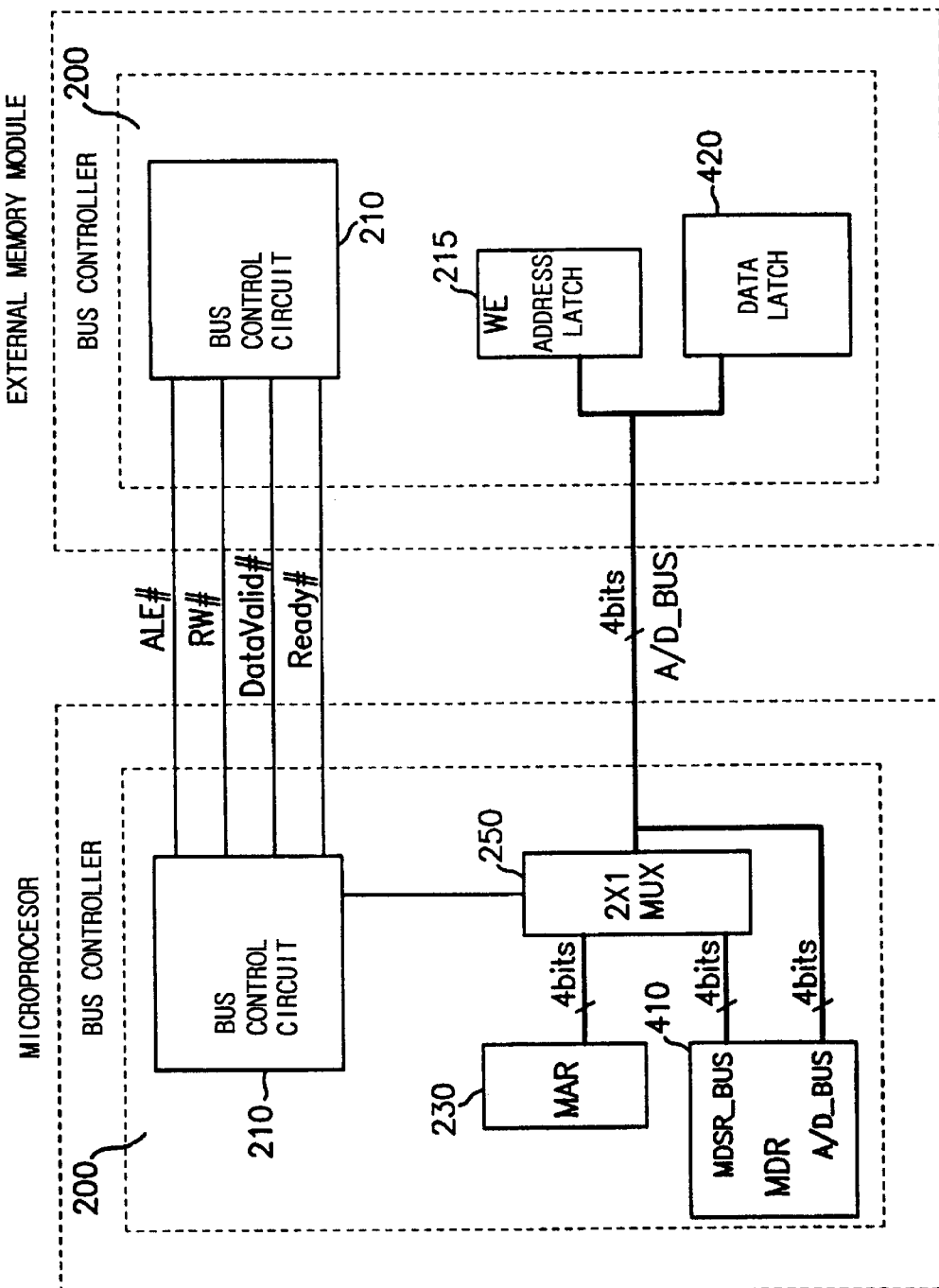
FIG. 4 shows a detailed block diagram of a microprocessor system employing data transmission technique in accordance with the present invention.

FIG. 4 shows a detailed block diagram of the microprocessor and the external memory module employing the combined serial/parallel data transmission method in accordance with the present inventions At the conventional parallel data transmission method, the memory data register (MDR) and the data latch(Data Latch) are implemented by using conventional registers. However, in the combined serial/parallel data transmission method in accordance with the present invention, these components have become more complex ones such as MDR 410 and a data latch 420. Furthermore, the bus controller can be changed to obtain above bus cycle shown in FIG. 3 by using a conventional method known to those who skilled in the art.

Figure 5:
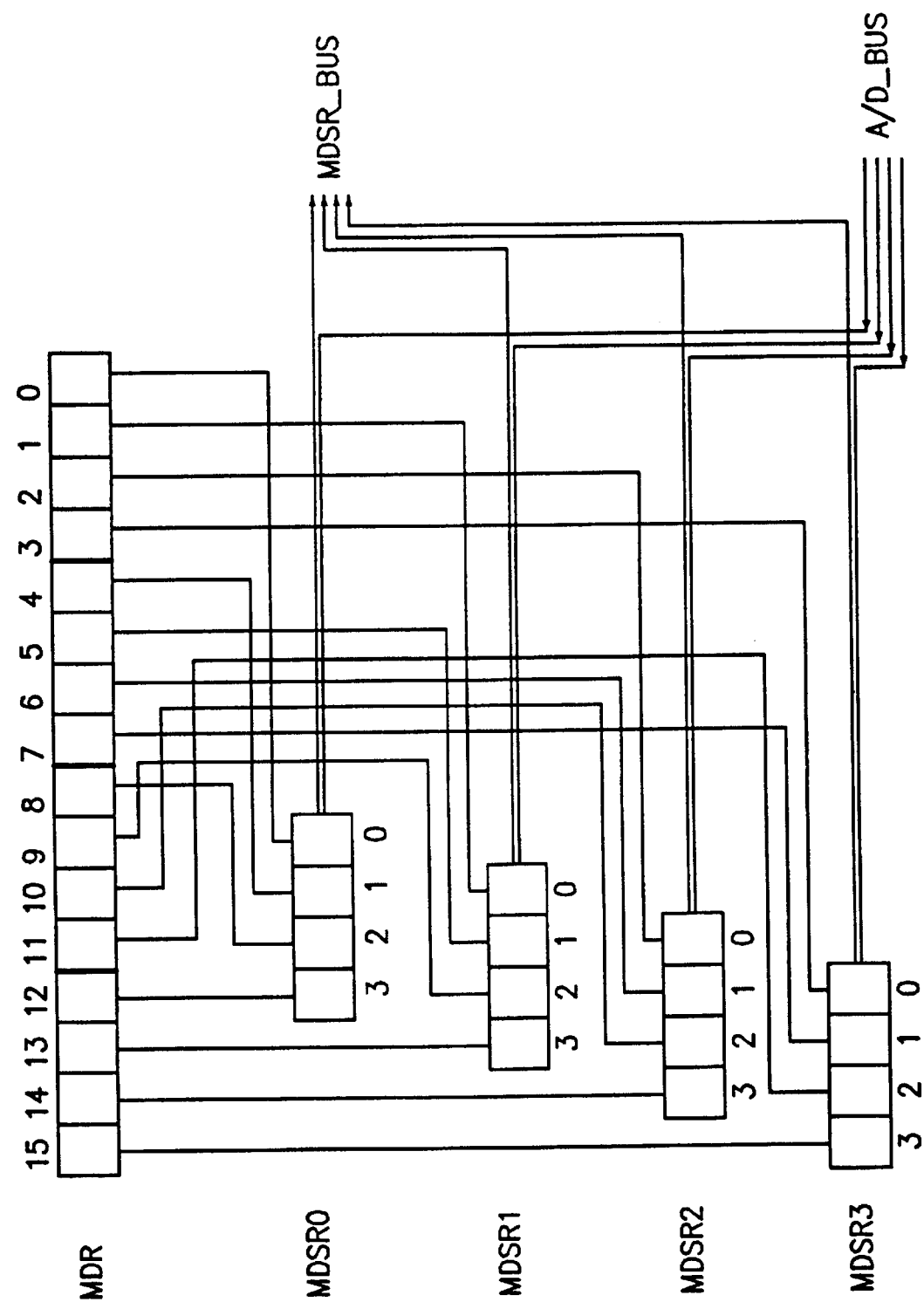
FIG. 5 provides a detailed block diagram of a memory data register (MAR) circuit shown in FIG. 4.

The MDR 410 and the data latch 420 constituting of the important part of the present invention will be explained in detail. FIG. 5 represents a detailed diagram of the MDR 410 in accordance with the present invention.

As described above, the case of 16 bits will be explained hereafter. The 16-bit full sized data is transferred in a 4-bit by 4-bit fashion, so that 16-bit full sized data transmission can be accomplished by using 4 times data transmission. The MDR 410 has the same role of the conventional MDR 240 shown in FIG. 2 except for the type of registers. In the combined serial/parallel data transmission method in accordance with the present invention, the data of the MDR 410 can not be loaded at a time, and the MDR 410 includes M, e.g., 4 shift-registers. The bit numbers of each of the shift-registers are decided as N/M, e.g., 16/4.

The N, e.g., 16-bit full sized data of MDR 410 is divided by M, e.g., 4 and is taken into N/M, e.g., 4 number of M, e.g., 4-bit shift-registers MDSR 0 to MDSR 3. As shown in FIG. 5, the least significant bit of each 4-bit data stored in the MDR 410 are taken into a first memory data shift register MDSR 0. And, the next bit of each 4-bit data are taken into a second MDSR1. By this way, the contents of MDR are stored to four MDSR 0 to 3. If 1-bit data is transferred sequentially from each of the MDSR 0 to 3 by using shift function, every M, e.g., 4-bit data per every clock period of the system clock can be transferred. When the data are read, in the opposite to the writing procedure of writing, the 4-bit data from the external memory module is taken from the A/D_BUS to be stored in the MDSRs 0 to 3; the 16-bit data is taken simultaneously from MDSRS 0 to 3; and are then loaded to the MSR 410. The hardware facilities may not be necessary, because the MDR 410 and MDSR 0 to 3 are hard wired each other.

Figure 6:
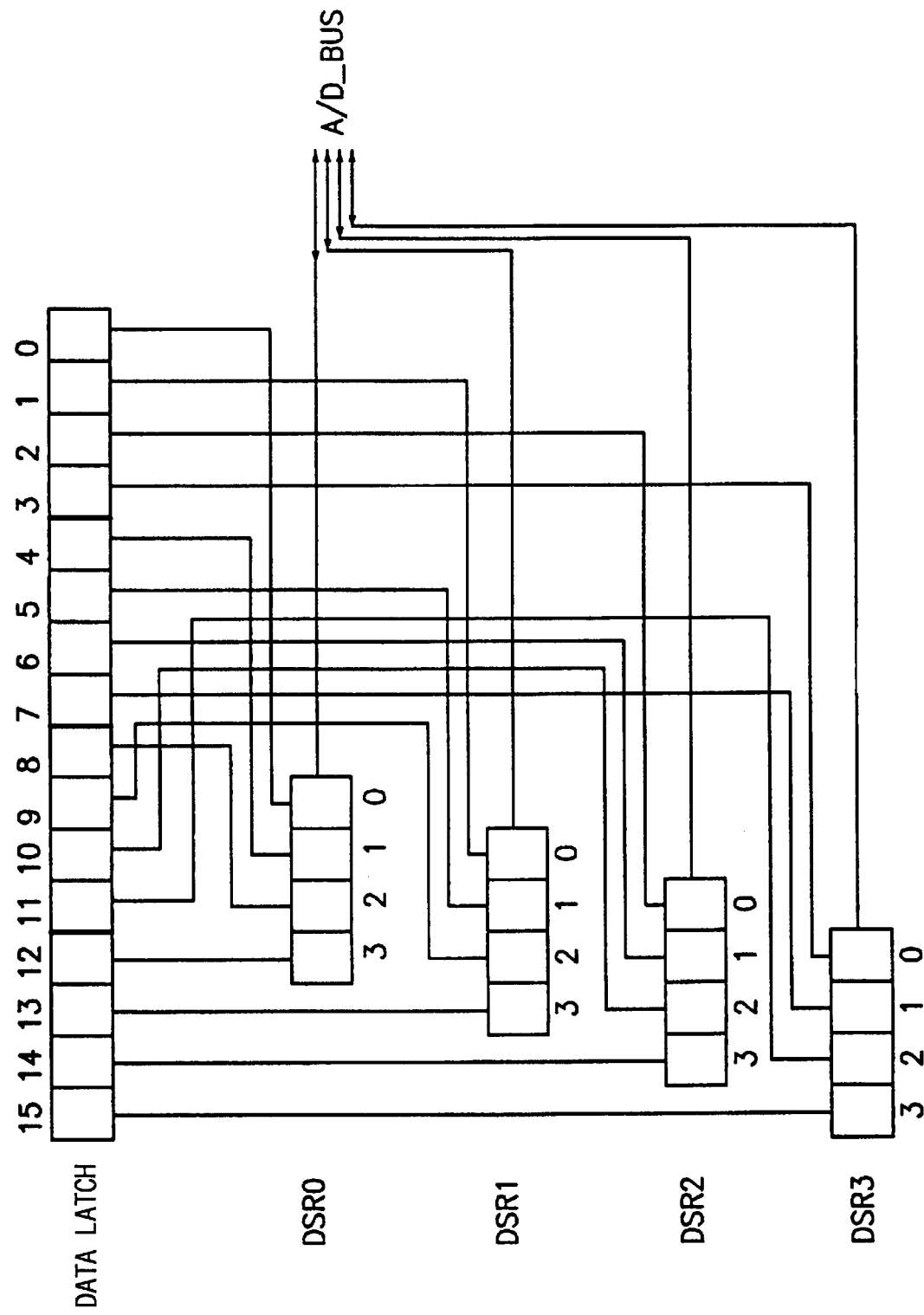
FIG. 6 depicts a detailed circuit diagram of a data latch circuit shown in FIG. 4.

FIG. 6 illustrates the data latch 420 in accordance with the present invention. The data latch 420 is provided with the external memory module and its operation is similar to to that of the MDR 410 shown in FIG. 5. The data latch 420 has 4 data shift registers DSR0–DSR3, so that 4 bits through 4 times are sent and received in order to process 16-bit full sized data. These shift registers DSR 0 to DSR 3 send and receive the data with the memory data shift registers MDSR 0 to MDSR 3.

As can be seen from the above, as the microprocessor system become high powered, the number of data, which is processed at a time, is increased. However, there is still a limitation at increasing the number of pins. In order to overcome this demerit, the conventional parallel transmission process has been replaced by the combined serial/parallel transmission process, so it becomes possible to process the extended data. And a degrading of the performance of the microprocessor which can be caused by adopting the serial method can be minimized.

While the present invention has been described with respect to certain preferred embodiments only, other modifications and variations may be made without departing from the spirit and scope of the present invention as set forth in the following claims.

What is claimed is:

1. A method for transmitting data between a microprocessor and an external memory module through external package pins of the microprocessor, comprising the steps of:
   a) dividing N-bit full sized data to be transferred by using M, wherein N and M are positive integers and N is greater than M, wherein the step a) comprises the steps of storing a least significant bit of each M-bit divided data as a first bit group, and storing an Mth bit of each M-bit divided data as an Mth bit group;
   b) sequentially transferring N/M number of M-bit divided data;
   c) temporarily storing the N/M number of M-bit divided data; and
   d) simultaneously combining the N/M number of M-bit divided data into the N-bit full sized data.

2. The method as recited in claim 1, wherein the step b) comprises the step of transferring data from each bit group on a bit-by-bit basis.

3. The method as recited in claim 1, wherein the number of the external package pins is M.

4. The method as recited in claim 1, wherein the M is chosen as identical to or greater than a size of address bus in the microprocessor, when the microprocessor includes a common bus sharing address and data bus and the size of the address bus is smaller than that of the data bus.

5. A combined serial/parallel process for transmitting data between a microprocessor and an external memory module, comprising:

a memory data register for dividing N-bit full sized data to be transferred by using M, wherein N and M are positive integers and N is greater than M, and sequentially transferring N/M number of M-bit divided data; and a data latch for temporarily storing the N/M number of M-bit divided data, and simultaneously combining the N/M number of M-bit divided data into the N-bit full sized data;

wherein the memory data register stores a least significant bit of each M-bit divided data as a first bit group, and an Mth bit of each M-bit divided data as an Mth bit group.

6. A combined serial/parallel process for transmitting data between a microprocessor and an external memory module according to claim 5, wherein the memory data register transfers data from each bit group on a bit-by-bit basis.

7. A combined serial/parallel process for transmitting data between a microprocessor and an external memory module according to claim 5, wherein the number of the external package pins is M.

8. A combined serial/parallel process for transmitting data between a microprocessor and an external memory module according to claim 5, wherein the M is chosen as identical to or greater than a size of address bus in the microprocessor, when the microprocessor includes a common bus sharing address and data bus and the size of the address bus is smaller than that of the data bus.

* * * * *